(12) United States Patent
Kyu et al.

(10) Patent No.: US 12,307,697 B2
(45) Date of Patent: May 20, 2025

(54) CONTAINER MEASUREMENT SYSTEM

(71) Applicant: KOBELCO CONSTRUCTION MACHINERY CO., LTD., Hiroshima (JP)

(72) Inventors: Shingun Kyu, Hiroshima (JP); Yukihiro Hoso, Hiroshima (JP); Sho Fujiwara, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 591 days.

(21) Appl. No.: 17/762,885

(22) PCT Filed: Aug. 24, 2020

(86) PCT No.: PCT/JP2020/031818
§ 371 (c)(1),
(2) Date: Mar. 23, 2022

(87) PCT Pub. No.: WO2021/059823
PCT Pub. Date: Apr. 1, 2021

(65) Prior Publication Data
US 2022/0343524 A1  Oct. 27, 2022

(30) Foreign Application Priority Data

Sep. 26, 2019 (JP) .................. 2019-176035

(51) Int. Cl.
*G06T 7/55* (2017.01)
*B65G 67/04* (2006.01)
(Continued)

(52) U.S. Cl.
CPC ............... *G06T 7/55* (2017.01); *B65G 67/04* (2013.01); *E02F 9/26* (2013.01); *G01S 17/894* (2020.01);
(Continued)

(58) Field of Classification Search
None
See application file for complete search history.

(56) References Cited

U.S. PATENT DOCUMENTS

2013/0245828 A1 9/2013 Tateno et al.
2017/0328032 A1 11/2017 Matsuo et al.
(Continued)

FOREIGN PATENT DOCUMENTS

CN 104476552 A 4/2015
CN 106839975 A 6/2017
(Continued)

OTHER PUBLICATIONS

Extended European Search Report issued Oct. 21, 2022, in corresponding European Patent Application No. 20868142.9, 8 pages.
(Continued)

*Primary Examiner* — Sean M Conner
(74) *Attorney, Agent, or Firm* — Oblon, McClelland, Maier & Neustadt, L.L.P.

(57) ABSTRACT

A container measuring system includes a distance image acquiring part and a calculation part. The distance image acquiring part is provided on a working machine for performing a work of loading into a container, and is capable of acquiring a distance image of the container. The calculation part processes the distance image of the container acquired by the distance image acquiring part. The calculation part calculates a three-dimensional position of a flat face part constituting the container on the basis of the distance image of the container. The calculation part calculates three-dimensional information including a three-dimensional position and a three-dimensional shape of the container on the basis of the three-dimensional position of the flat face part.

7 Claims, 7 Drawing Sheets

(51) Int. Cl.
*E02F 9/26* (2006.01)
*G01S 17/894* (2020.01)
*G06T 7/521* (2017.01)
*G06T 7/73* (2017.01)

(52) U.S. Cl.
CPC ............... *G06T 7/521* (2017.01); *G06T 7/73* (2017.01); *G06T 2207/10012* (2013.01)

(56) References Cited

U.S. PATENT DOCUMENTS

| | | | |
|---|---|---|---|
| 2018/0120098 A1 | 5/2018 | Matsuo et al. | |
| 2018/0142441 A1 | 5/2018 | Berry et al. | |
| 2018/0245308 A1 | 8/2018 | Ready-Campbell et al. | |
| 2019/0106859 A1* | 4/2019 | Frank | G01F 22/00 |
| 2019/0325595 A1* | 10/2019 | Stein | G06V 10/82 |
| 2021/0292998 A1 | 9/2021 | Kawamoto | |

FOREIGN PATENT DOCUMENTS

| | | |
|---|---|---|
| CN | 108779628 A | 11/2018 |
| CN | 109903337 A | 6/2019 |
| CN | 109945779 A | 6/2019 |
| EP | 2 560 384 A1 | 2/2013 |
| EP | 3 040 237 A1 | 7/2016 |
| JP | 11-211438 A1 | 8/1999 |
| JP | 2000-64359 A | 2/2000 |
| JP | 2000-192514 A | 7/2000 |
| JP | 2016-89388 A | 5/2016 |
| JP | 2020-35380 A | 3/2020 |
| JP | 2020-126363 A | 8/2020 |
| WO | WO 2017/184037 A1 | 10/2017 |

OTHER PUBLICATIONS

Combined Chinese Office Action and Search Report issued Mar. 14, 2024 in Chinese Patent Application No. 202080066936.8 (with unedited computer-generated English translation), 20 pages.
International Search Report issued Oct. 13, 2020 in PCT/JP2020/031818 filed Aug. 24, 2020, 2 pages.
Combined Chinese Office Action and Search Report issued Oct. 22, 2024, in corresponding Chinese Patent Application No. 202080066936.8 (with English Translation), 18 pages.

* cited by examiner

CONTAINER MEASUREMENT SYSTEM

TECHNICAL FIELD

The present invention relates to a container measuring system for calculating three-dimensional information on a container.

BACKGROUND ART

For example, Patent Literature 1 discloses a technology calculating three-dimensional information on a container. According to the technology disclosed in this Literature, an image of four characteristic points of a container is taken by a camera, and a three-dimensional position of each characteristic point is calculated.

However, it is difficult to stably calculate three-dimensional information of characteristic points because there are occasions that a characteristic point cannot be properly taken by a camera. Consequently, it is difficult to stably calculate three-dimensional information on a container.

CITATION LIST

Patent Literature

Patent Literature 1: Japanese Unexamined Patent Publication No. 2000-064359

SUMMARY OF INVENTION

Accordingly, an object of the present invention is to provide a container measuring system which enables a stable calculation of three-dimensional information on a container.

A container measuring system includes a distance image acquiring part and a calculation part. The distance image acquiring part is provided on a working machine for performing a work of loading into a container including a flat face part, and is capable of acquiring a distance image of the container. The calculation part processes the distance image of the container acquired by the distance image acquiring part. The calculation part calculates a three-dimensional position of the flat face part on the basis of the distance image of the container. The calculation part calculates three-dimensional information including a three-dimensional position and a three-dimensional shape of the container on the basis of the three-dimensional position of the flat face part.

DESCRIPTION OF EMBODIMENTS

A container measuring system 30 (see FIG. 3), and a transport vehicle 10 (see FIG. 1) and a working machine 20 (see FIG. 1) in which the container measuring system 30 is used will be described with reference to FIGS. 1 to 5.

Figure 1:
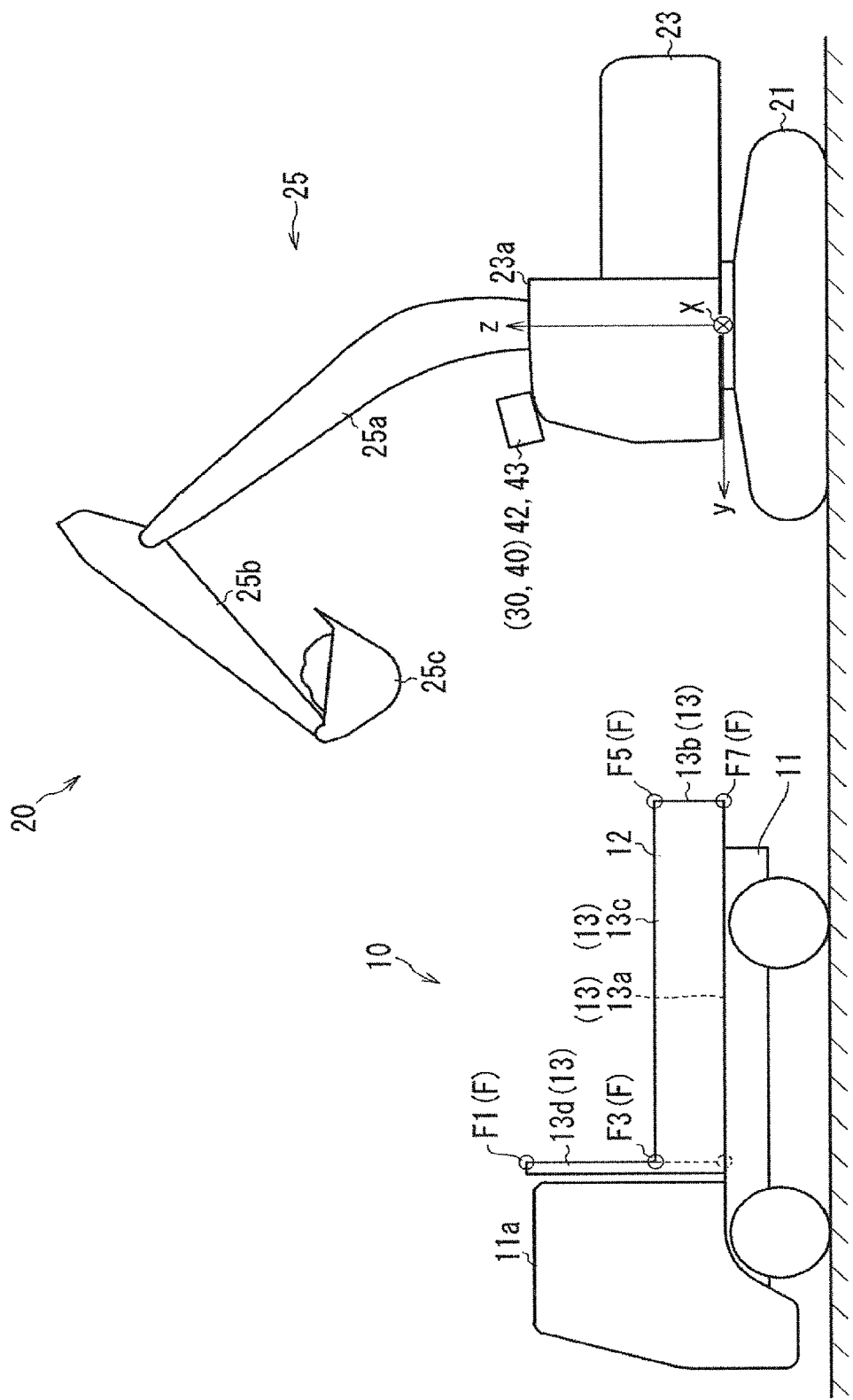
FIG. 1 is a side view of a transport vehicle 10 and a working machine 20 in which a container measuring system 30 is used.

The transport vehicle 10 is a vehicle including a container 12 as shown in FIG. 1. The transport vehicle 10 is a vehicle for transporting a mass of matter (transport matter) that is loaded by the working machine 20, such as a dump truck and a truck. The transport vehicle 10 includes a main body part 11 and the container 12. The main body part 11 is capable of traveling, and supports the container 12. The main body part 11 includes an operating room 11a.

The container 12 contains the transport matter. The transport matter placed in the container 12 is, for example, earth and sand, or wastes (such as industrial waste). The container 12 serves as a box bed provided on the transport vehicle 10. The container 12 is provided behind the operating room 11a or on a rear portion of the transport vehicle 10. Hereinafter, directions of the transport vehicle 10 are referred to as "rearward in view of the transport vehicle" for a direction from the operating room 11a to the container 12, and to as "forward in view of the transport vehicle" for a direction from the container 12 to the operating room 11a. The container 12 is movable against the main body part 11, or may be fixedly provided on the main body part 11. The container 12 has, for example, a box shape having no lid (see FIG. 2). The container 12 defines a flat face part 13. The container 12 may not be provided on the transport vehicle 10 as the box bed, but may be, for example, placed directly on the ground. The following description will be made about the case where the container 12 is the box bed provided on the transport vehicle 10.

Figure 2:
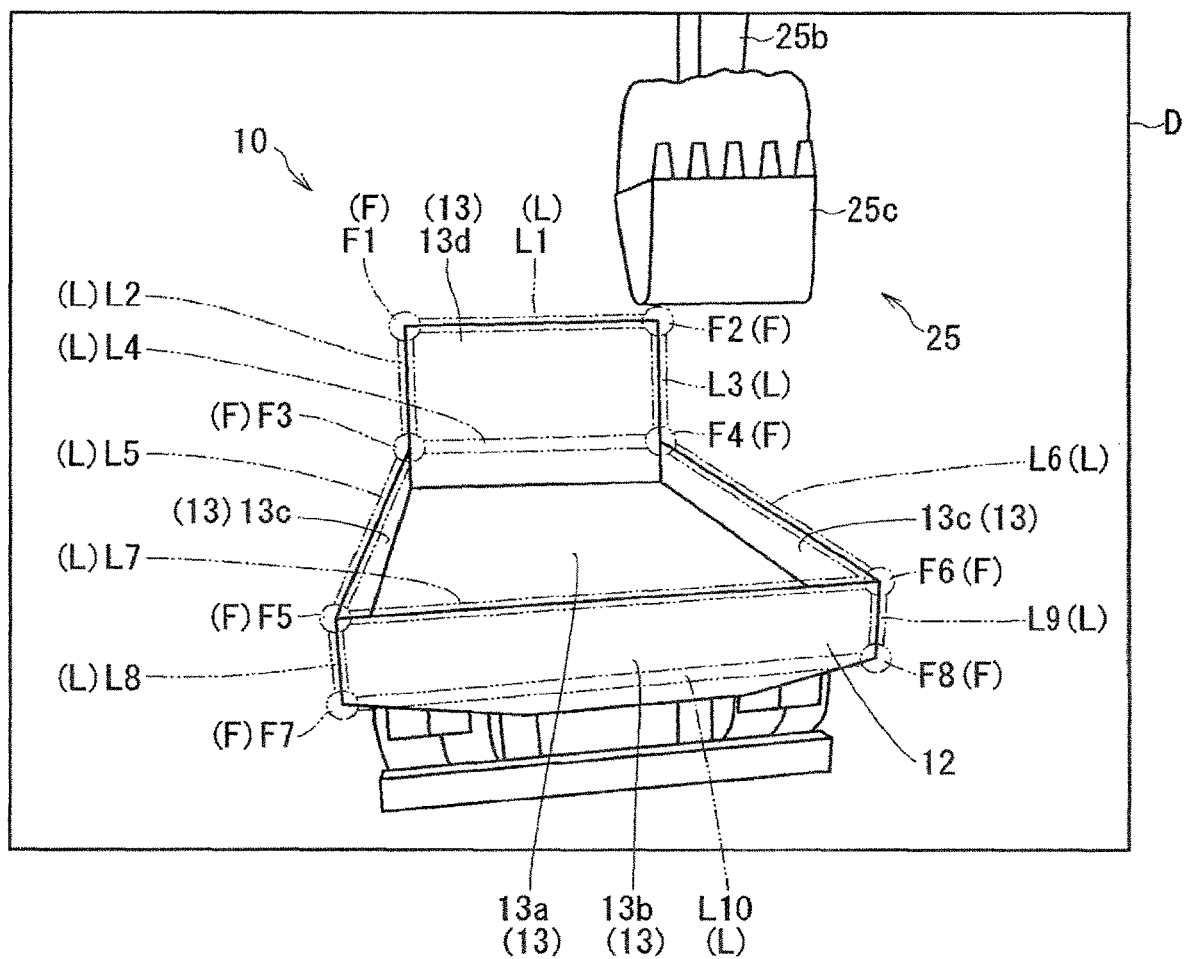
FIG. 2 is a diagram showing a distance image D acquired by a distance image acquiring part 40 shown in FIG. 1.

The flat face part 13 is a section of the container 12 that is flat or substantially flat as shown in FIG. 2. The flat face part 13 appears to be largely flat or substantially flat over a whole extent. The flat face part 13 has a recess and projection, or a generally curved surface to some extent. The flat face part 13 includes a floor surface 13a, a rear surface 13b, side surfaces 13c, and a front surface 13d. The floor surface 13a is a bottom surface (a lower surface) of the container 12. The rear surface 13b is a surface of the container 12 that is rearward in view of the transport vehicle, and protrudes upwardly from a section of the floor surface 13a that is rearward in view of the transport vehicle. The side surfaces 13c correspond to left and right surfaces of the container 12, and protrude upwardly from left and right end sections of the floor surface 13a. The front surface 13d is a surface of the container 12 that is forward in view of the transport vehicle, and protrudes upwardly from a section of the floor surface 13a that is forward in view of the transport vehicle. The front surface 13d protrudes more upwardly than the side surfaces 13c and the rear surface 13b. The floor surface 13a is an exemplary bottom surface. The rear surface 13b, two side surfaces 13c, and the front surface 13d are exemplary surfaces surrounding the bottom surface.

The working machine 20 is a machine for performing a work of loading a mass of matter into the container 12 as shown in FIG. 1. The working machine 20 may be, for example, capable of shoveling up the transport matter, or nipping and gripping the transport matter. The working machine 20 is, for example, a construction machine for performing a construction work, such as an excavator. The working machine 20 includes a lower traveling body 21, an upper slewing body 23, and an attachment 25.

The lower traveling body 21 causes the working machine 20 to move. The lower traveling body 21 includes, for example, a crawler. The upper slewing body 23 is slewably mounted on the lower traveling body 21. The upper slewing body 23 includes a cab 23*a*. The attachment 25 is a section for transferring the transport matter. The attachment 25 includes a boom 25*a*, an arm 25*b*, and a leading end attachment 25*c*. The boom 25*a* is raisably and lowerably (vertically rotatably) attached to the upper slewing body 23. The arm 25*b* is rotatably (pushably and pullably) attached to the boom 25*a*. The leading end attachment 25*c* is provided on a leading end portion of the attachment 25, and is rotatably attached to the arm 25*b*. The leading end attachment 25*c* may be a bucket for shoveling up the transport matter (e.g., earth and sand), or a device (such as a grapple) for nipping and gripping the transport matter.

Figure 3:
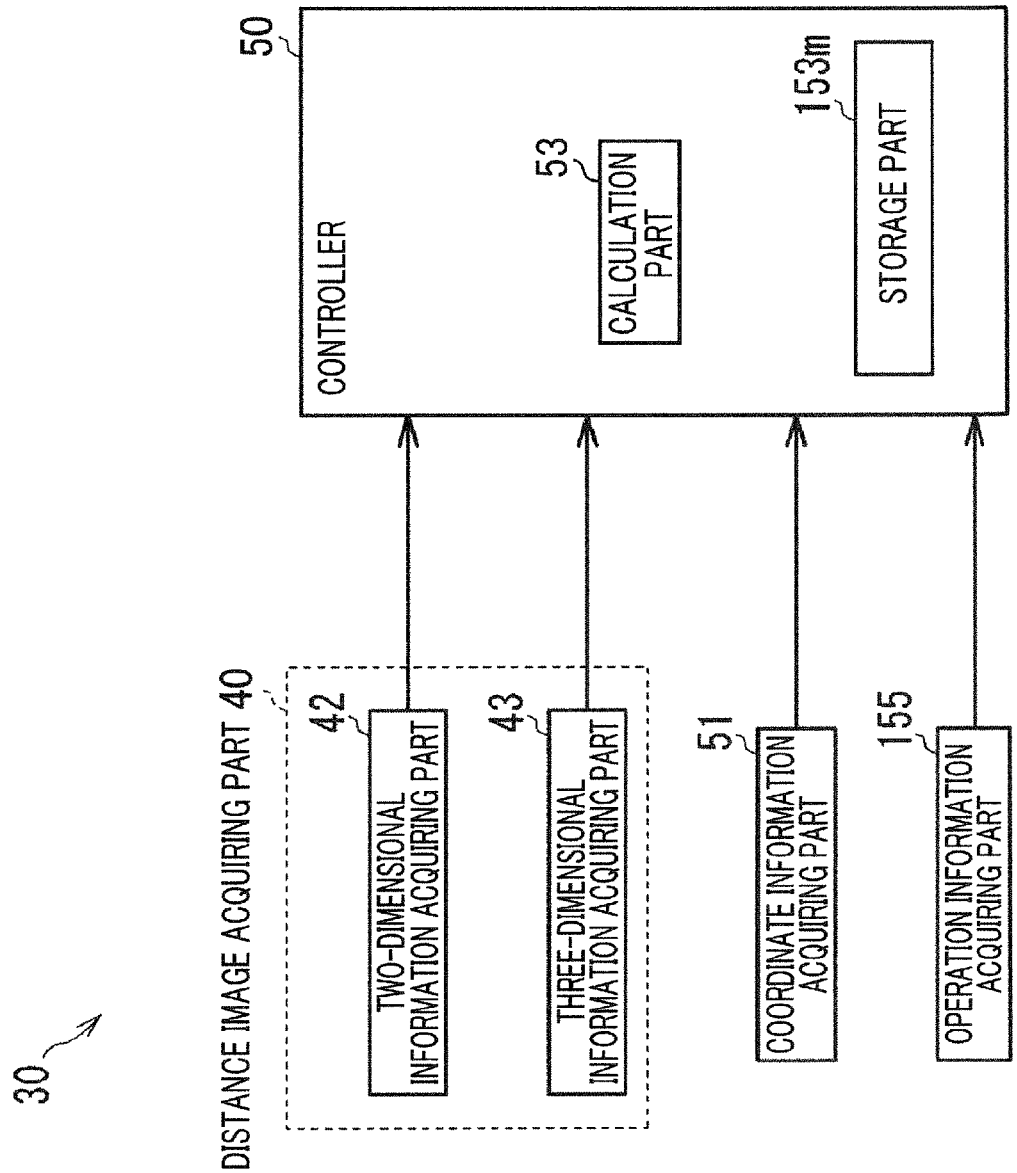
FIG. 3 is a block diagram showing the container measuring system 30 provided on the working machine 20 shown in FIG. 1.

The container measuring system 30 (see FIG. 3) is a system for obtaining information of three dimensions (three-dimensional information) of the container 12. The container measuring system 30 measures a position, a direction, and a shape of the container 12 with respect to the working machine 20. The container measuring system 30 includes a distance image acquiring part 40, a coordinate information acquiring part 51, and a controller 50 as shown in FIG. 3. An operation information acquiring part 155 shown in FIG. 3 will be described later.

The distance image acquiring part 40 acquires a distance image D (see FIG. 2) containing the container 12 shown in FIG. 1. The distance image D is an image containing distance information (depth information). The distance image acquiring part 40 is provided on the working machine 20. The distance image acquiring part 40 is arranged at a position which enables acquisition of the distance image D (see FIG. 2) of the container 12 and a portion around the container 12 when the working machine 20 performs a work of loading. The distance image acquiring part 40 may be arranged (disposed), for example, in the cab 23*a*, or may be arranged outside the cab 23*a*. In the embodiment shown in FIG. 1, the distance image acquiring part 40 is arranged on an upper surface of the cab 23*a*. The distance image acquiring part 40 may automatically track the container 12 to acquire the distance image D (see FIG. 2) of the container 12. The distance image acquiring part 40 includes a two-dimensional information acquiring part 42 and a three-dimensional information acquiring part 43.

The two-dimensional information acquiring part 42 (image taking means) acquires two-dimensional image information (takes an image) including the container 12. The two-dimensional information acquiring part 42 includes a camera. The three-dimensional information acquiring part 43 (3D sensor, dimension measuring means) acquires three-dimensional information on the container 12. The three-dimensional information acquiring part 43 measures a distance from the three-dimensional information acquiring part 43 to each part (details will be described later) of the container 12. Specifically, for example, the three-dimensional information acquiring part 43 may be provided with a LiDAR (Light Detection and Ranging or Laser Imaging Detection and Ranging), may be provided with a stereo camera, or may be provided with a TOF (Time-of-Flight) sensor. The three-dimensional information acquiring part 43 generates a distance image D on the basis of the measured distance, and inputs to the controller 50.

The coordinate information acquiring part 51 (see FIG. 3) acquires coordinate information (to be described later). For example, the coordinate information acquiring part 51 shown in FIG. 3 may use coordinate information manually input by an operator of the working machine 20 (see FIG. 1), may use coordinate information stored in a storage medium and the like, or may use coordinate information via communication. The coordinate information acquiring part 51 may be provided on the working machine 20, or may be provided outside the working machine 20 (at a position away from the working machine 20). The controller 50 also may be externally provided. For example, the controller 50 may be provided on a server communicably connected to the working machine 20.

The controller 50 executes an input and output of a signal, a computation such as determination and calculation, a storage of information, and the like. The controller 50 includes a calculation part 53 and a storage part 153*m*. The calculation part 53 processes a distance image D (see FIG. 2) of the container 12 (see FIG. 2) acquired by the distance image acquiring part 40. More specifically, the calculation part 53 calculates a position (three-dimensional position) in three dimensions of the flat face part 13 constituting the container 12 on the basis of the distance image D of the container 12 shown in FIG. 2. Thereafter, the calculation part 53 (see FIG. 3) calculates three-dimensional information on the container 12 on the basis of the three-dimensional position of the flat face part 13. The details of the processing by the calculation part 53 are as follows. The storage part 153*m* shown in FIG. 3 will be described later.

Operation

Figure 4:
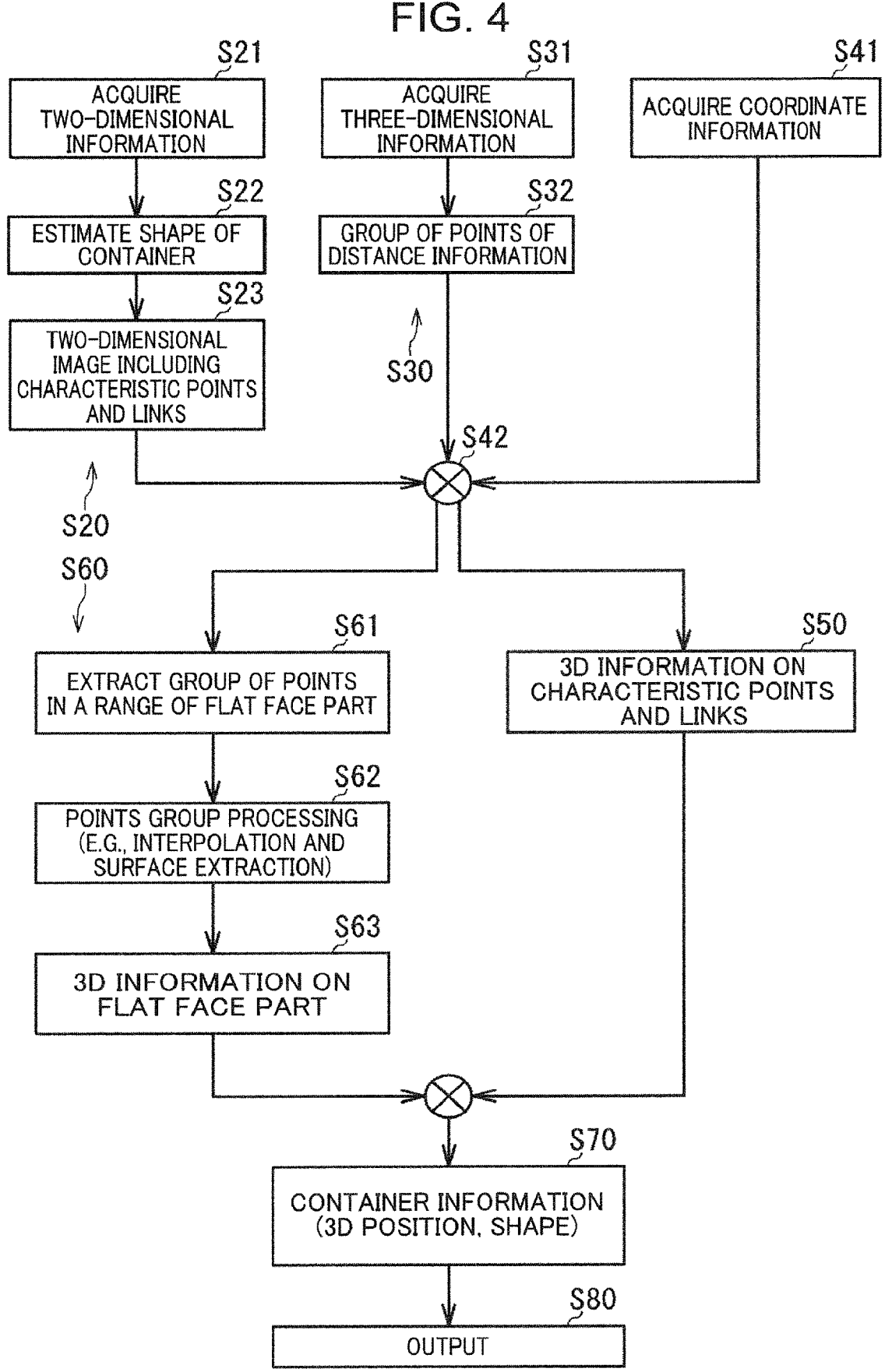
FIG. 4 is a chart showing a flow of operations of the container measuring system 30 shown in FIG. 3.
Figure 5:
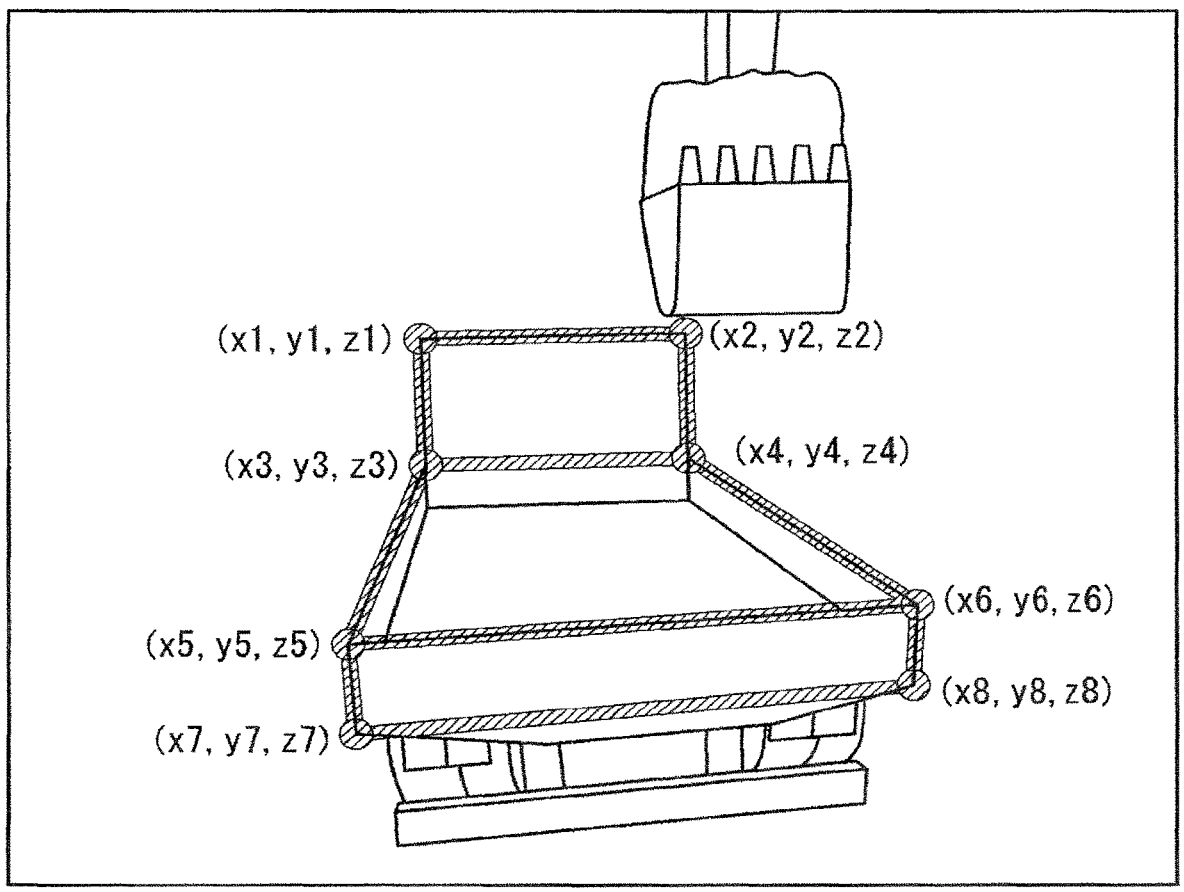
FIG. 5 is a diagram showing a representation of three-dimensional information on the container 12 shown in FIG. 2.

The container measuring system 30 (see FIG. 3) is configured to operate as follows. The following description will be made about processings of the calculation part 53 (see FIG. 3) by principally referring to FIG. 4. The container 12 will be described with reference to FIG. 2, and each constituent element (such as the distance image acquiring part 40 and the calculation part 53) of the container measuring system 30 will be described with reference to FIG. 3. The calculation part 53 executes two-dimensional information processing S20, three-dimensional information processing S30, and coordinate information acquisition (S41) as shown in FIG. 4. Thereafter, the calculation part 53 calculates three-dimensional information on the container 12 by combining these information (S50, S61 to S63, and S70), and outputs the calculated three-dimensional information (S80).

Two-Dimensional Information Processing S20 and the Like

The calculation part 53 shown in FIG. 3 executes the two-dimensional information processing S20 (see FIG. 4). The reason therefor will be described hereinafter. There are occasions that a distance image D acquired by the three-dimensional information acquiring part 43 could be hardly processed in the raw by the calculation part 53. It is inferred, for example, a case where the processing speed becomes low. Accordingly, the calculation part 53 extracts a position of the container 12 (see FIG. 2) in two-dimensional information (hereinafter, referred to as "image") acquired by the two-dimensional information acquiring part 42. Thereafter, the calculation part 53 extracts a section (a part of points data) in an image that corresponds to the position of the container 12 (see FIG. 2) among distance images D (points data) acquired by the three-dimensional information acquiring part 43. The calculation part 53 thus executes the two-dimensional information processing S20 (see FIG. 4) to extract a part of the points data. Specific operations of the container measuring system 30 in connection with the two-dimensional information processing S20 and the like are described below. It should be noted that the calculation part 53 is not required to execute the two-dimensional information processing S20 when the calculation part 53 can process distance images D acquired by the three-dimensional information acquiring part 43 in the raw.

The two-dimensional information acquiring part 42 acquires an image including the container 12 (see FIG. 2) (Step S21 shown in FIG. 4). Information on this image is input to the calculation part 53. Thereafter, the calculation part 53 estimates a shape of the container 12 on the basis of the acquired image (Step S22 shown in FIG. 4). Specifically, the calculation part 53 extracts (identifies, estimates) positions of characteristic points F (F1 to F8) in the image and positions of links L (L1 to L9) in the image as shown in FIG. 2. The calculation part 53 extracts the characteristic points F and the links L by running a software for extracting a specific shape from the image, for example. This software uses, for example, deep learning technology. This enables the calculation part 53 to extract two-dimensional information containing an image including the container 12, positions of characteristic points F in the image, and positions of links L in the image (Step S23 shown in FIG. 4).

The characteristic points F are points corresponding to corners of the flat face part 13. The links L are lines connecting characteristic points F to one another, and corresponding to, for example, sides of the flat face part 13. In the embodiment shown in FIG. 2, the positions of the characteristic points F respectively correspond to positions of two points (F1, F2) in an upper end of the front surface 13*d*, positions of two points (F3, F4) in upper ends of two side surfaces 13*c* which are forward in view of the transport vehicle, and positions of four points (F5 to F8) at corners of the rear surface 13*b*. For example, in a case where a lower end of the front surface 13*d* is in the image, a position in the lower end of the front surface 13*d* may be extracted as a characteristic point F (see FIG. 1). In the embodiment shown in FIG. 2, the positions of the links L respectively correspond to positions of four sides (L1 to L4) of a quadrilateral portion of the front surface 13*d* that is above the side surfaces 13*c*. Besides, the positions of the links L respectively correspond to positions of upper sides (L5, L6) of the side surfaces 13*c* and four sides (L7 to L10) of the rear surface 13*b* (more specifically, four sides of a quadrilateral substantially overlapping the rear surface 13*b*).

Three-Dimensional Information Processing S30 and the like

The three-dimensional information acquiring part 43 (see FIG. 3) acquires the distance images D including the container 12 (Step S31 shown in FIG. 4). Information on the distance images D is input to the calculation part 53. Specifically, the calculation part 53 acquires data concerning a group of points (hereinafter, simply referred to as "group of points") for dimensional information (Step S32 shown in FIG. 4).

Coordinate Information Acquisition and the Like

The coordinate information acquiring part 51 (see FIG. 3) acquires coordinate information (Step S41 shown in FIG. 4). The coordinate information is information (calibration information, sensor fusion information) for representing information acquired by the distance image acquiring part 40 in a predetermined coordinate system. "The predetermined coordinate system" is, for example, a coordinate system (machine coordinate system) whose origin is at a specific position in the working machine 20 shown in FIG. 1. In FIG. 1, as an example, three axes of the machine coordinate system are indicated at x, y, and z. The position of the origin of the machine coordinate system may be set in various ways. In the embodiment shown in FIG. 1, the origin is set at a point that lies along a rotational axis of the upper slewing body 23 over the lower traveling body 21 and at a lower end of the upper slewing body 23. The predetermined coordinate system may have its origin at a specific position (e.g., a specific position in a working site) outside the working machine 20. The following description will be made about the case where the predetermined coordinate system is the machine coordinate system.

The coordinate information includes information to convert the two-dimensional information acquired through the two-dimensional information processing S20 (see FIG. 4) to machine coordinates. The coordinate information includes information to convert the distance image D (see FIG. 2) acquired through the three-dimensional information processing S30 (see FIG. 4) to machine coordinates. The coordinate information includes information to superimpose the two-dimensional information and the three-dimensional information (distance image D). The coordinate information may include a transformation matrix expressing a relative position between the two-dimensional information acquiring part 42 and the three-dimensional information acquiring part 43. Specifically, for example, the coordinate information includes a parameter for a perspective projection transformation of the distance image acquiring part 40. More specifically, the coordinate information includes an external parameter induced from the arranged position and angle of the distance image acquiring part 40 and an internal parameter induced from a distortion of the distance image D (see FIG. 2) caused by a lens of the distance image acquiring part 40. When a parameter of the distance image acquiring part 40 changes (e.g., when the arranged position, angle, and machine type, and the like changes), the coordinate information acquiring part 51 acquires new coordinate information.

Next, as shown in FIG. 4, the calculation part 53 combines (integrates) the two-dimensional information acquired through the two-dimensional information processing S20, the three-dimensional information (distance image D, see FIG. 2) acquired through the three-dimensional information processing S30, and coordinate information (Step S42 shown in FIG. 4).

Specifically, the calculation part 53 converts the two-dimensional information and the three-dimensional information (distance image D) to machine coordinates on the basis of the coordinate information.

Three-Dimensional Information on Characteristic Point F and Link L (Processing S50)

The calculation part 53 calculates three-dimensional coordinates of the characteristic points F and the links L shown in FIG. 2 (Processing S50 shown in FIG. 4). The calculation part 53 calculates three-dimensional coordinates (three-dimensional coordinates in the machine coordinate system) of the corners of the flat face part 13 corresponding to the positions of the characteristic points F. Thus, the three-dimensional information on the links L connecting the characteristic points F is calculated. Three-dimensional information on the container 12 (specifically, on the characteristic points F and the links L) can be acquired by these calculations. On the other hand, according to the present embodiment, the accuracy of the three-dimensional information on the container 12 can be further increased by calculating three-dimensional information on the flat face part 13 as described below.

Processing of Three-Dimensional Information on Flat face Part 13 (S60)

The calculation part 53 calculates the three-dimensional position of the flat face part 13 constituting the container 12 on the basis of the distance image D of the container 12. Specifically, the calculation part 53 executes the following processing.

The calculation part 53 extracts information (a part of group of points) on a section corresponding to the flat face part 13 from the distance image D (the entirety of the group of points) acquired by the three-dimensional information acquiring part 43 (see FIG. 3). The calculation part 53 extracts a specific group of points of the flat face part 13 from the distance image D. For example, the calculation part 53 extracts groups of points of sections corresponding to the front surface 13d (specific surface) and the rear surface 13b (specific surface) from the distance image D. The calculation part 53 may extract a group of points of a section corresponding to at least one surface (specific surface) of the side surfaces 13c and the floor surface 13a. In a case where the container 12 is empty (or substantially empty), the calculation part 53 may extract groups of points of the entire flat face part 13 (i.e., of the floor surface 13a, the rear surface 13b, the side surfaces 13c, and the front surface 13d) from the distance image D. Hereinafter, surfaces 13 (specific surface) to which the point extraction is directed will be simply referred to as "the flat face part 13".

Specifically, the calculation part 53 determines (selects) a group of points to be extracted from the distance image D on the basis of positions of the links L in the image. More specifically, the calculation part 53 extracts a group of points of a section (within a scope) which is surrounded by the links L and corresponds to the flat face part 13 from the distance image D. Specifically, the calculation part 53 extracts a group of points of a section surrounded by the links L1, L2, L3, and L4 in the case of extracting a group of points of the front surface 13d from the distance image D. The calculation part 53 extracts a group of points of a section surrounded by the links L7, L8, L9, and L10 in a case of extracting a group of points of the rear surface 13b from the distance image D.

The calculation part 53 executes a processing of calculating three-dimensional information on the flat face part 13 on the basis of the group of points extracted from the distance image D (Step S62 shown in FIG. 4). For example, the calculation part 53 may interpolate information on a space between points constituting a group of points. For example, the calculation part 53 may execute a processing (robust estimation) of excluding outliers or reducing influence of outliers, specifically, e.g., a processing in accordance with RANSAC (Random Sample Consensus) method. For example, the calculation part 53 may execute a processing of determining a region (division, segmentation) corresponding to each surface (such as the front surface 13d and the rear surface 13b) of the flat face part 13. For example, the calculation part 53 may divide a group of points extracted from the distance image D into a region of the flat face part 13 and a region other than the flat face part 13. For example, in a case where an obstacle (to be described later) exists between the flat face part 13 and the distance image acquiring part 40 (see FIG. 1), the calculation part 53 may divide a group of points extracted from the distance image D into the region of the flat face part 13 and a region where the obstacle exists.

The calculation part 53 calculates three-dimensional information on the flat face part 13 (Step S63 shown in FIG.4). The three-dimensional information on the flat face part 13 calculated by the calculation part 53 includes information on the three-dimensional position (three-dimensional coordinates). Consequently, the three-dimensional information on the flat face part 13 calculated by the calculation part 53 includes information on a direction of the flat face part 13 (for example, a normal direction). The three-dimensional information on the flat face part 13 may include three-dimensional coordinates of three or more points on a surface of the flat face part 13. The three-dimensional information on the flat face part 13 may include the normal direction to the flat face part 13 and three-dimensional coordinates of one or more points on the surface of the flat face part 13.

In the processing for "the three-dimensional information on characteristic points F and links L (Processing S50)", three-dimensional positions of the links L are calculated, and thus, information on a shape (external shape) of the flat face part 13 is calculated. On the other hand, in "the processing (S60) for the three-dimensional information of the flat face part 13", the three-dimensional information on the flat face part 13 to be calculated by the calculation part 53 may include or may not include information on the shape (external shape) of the flat face part 13.

There are cases where a section of the flat face part 13 is out of (beyond) the distance image D. For example, in a case where an obstacle exists between a section of the flat face part 13 and the distance image acquiring part 40 (see FIG. 1), and in a case where a section of the flat face part 13 is beyond the scope of the distance image D (see FIG. 7), the section of the flat face part 13 is out of the distance image D. The obstacle can be presumed to be a section (specifically, the attachment 25) of the working machine 20 shown in FIG. 1, a transport matter (such as earth and sand), rain, snow, and sand around the working machine 20. In the case where a section of the flat face part 13 is out of the distance image D (see FIG. 2), a distance from a section out of the distance image D to the three-dimensional information acquiring part 43 cannot be acquired by the three-dimensional information acquiring part 43. On the other hand, the calculation part 53 calculates (estimates) a three-dimensional position of the section of the flat face part 13 that is out of the distance image D on the basis of the three-dimensional position of the section of the flat face part 13 shown in FIG. 2 that is in the distance image D. In this estimation, it is assumed that the section that is in the distance image D and the section that is out of the distance image D are continuous over a common plane. The calculation part 53 may calculate (estimate) a three-dimensional shape of a section of the flat face part 13 that is out of the distance image D on the basis of the three-dimensional shape of the section of the flat face part 13 that is in the distance image D on the assumption that the flat face part 13 has a quadrilateral shape.

Next, the calculation part 53 acquires three-dimensional information ("container information" in FIG. 4) on the container 12 by combining (integrating) the calculated information pieces (Step S70 shown in FIG. 4). More specifically, as described above, the calculation part 53 calculates three-dimensional information on the characteristic points F and the links L through the processing S50 of "the three-dimensional information on characteristic points F and links L" (hereinafter, simply referred to as "Processing S50"). Besides, the calculation part 53 calculates three-dimensional information on the flat face part 13 through the processing (S60) of "three-dimensional information of the flat face part 13" (hereinafter, "Processing S60"). Thereafter, the calculation part 53 calculates three-dimensional information on the container 12 by combining the three-dimensional information on the characteristic points F and the links L and three-dimensional information on the flat face part 13 (determines information that will be finally output). The "three-dimensional information on the container 12" is information including the three-dimensional position and the three-dimensional shape.

For example, the calculation part 53 may correct the three-dimensional position of the characteristic point F calculated in the processing S50 on the basis of the three-dimensional information (information having a higher accuracy) on the flat face part 13 calculated in Processing S60. For example, the calculation part 53 may correct the shape of a section surrounded by the links L calculated in the processing S50 on the basis of the shape (information having a higher accuracy) of the flat face part 13 calculated in the processing S60.

Specifically, the three-dimensional information on the container 12 includes three-dimensional positions of the characteristic points F (corners of the flat face part 13). Further, the three-dimensional information on the container 12 includes information on the three-dimensional positions of the links L (sides of the flat face part 13). Further, the three-dimensional information on the container 12 includes information on the size of the link L. Further, the three-dimensional information on the container 12 includes information on the three-dimensional shape showing three-dimensional positions of the group of points of a section (a section of a surface of the flat face part 13) surrounded by the links L. The three-dimensional information on the container 12 may include information on the shape of only one section (only a specific surface) among the floor surface 13a, the rear surface 13b, the side surfaces 13c, and the front surface 13d of the flat face part 13. In the embodiment shown in FIG. 2, the three-dimensional information on the container 12 includes the three-dimensional position and shape (including the size) of a section of the front surface 13d which is above the upper ends of the side surfaces 13c, the three-dimensional positions of the sides in the upper ends of the side surfaces 13c, and the three-dimensional position and shape of the rear surface 13b.

Next, the calculation part 53 outputs three-dimensional information on the container 12 (Step S80 shown in FIG. 4). The calculation part 53 may output the three-dimensional information on the container 12 to an internal portion of the calculation part 53, for example, may output to another calculation or control to be executed by the calculation part 53. The calculation part 53 may output the three-dimensional information on the container 12 to an outside of the calculation part 53. The three-dimensional information on the container 12 may be used, for example, in the following manner.

[Example 1] The three-dimensional information on the container 12 may be used for various controls. [Example 1a] The three-dimensional information on the container 12 may be used for an automatic operation of the working machine 20 shown in FIG. 1, or may be used for assisting an operation of the working machine 20. [Example 1b] The three-dimensional information on the container 12 may be used for a control (such as a control to automatically regulate a motion or send a notification) to avoid collision between the working machine 20 and the container 12. [Example 1c] The three-dimensional information on the container 12 may be used for a control for a relative position between the working machine 20 and the container 12. [Example 1c1] For example, the three-dimensional information on the container 12 may be used for a control to automatically change a relative position between the working machine 20 and the container 12, and may be used for a control to notify a relative position between the working machine 20 and the container 12 to an operator. [Example 1c2] For example, the three-dimensional information on the container 12 may be used for a calculation of locus of a leading end attachment 25c from an actual location of the leading end attachment 25c to a position for discharging the transport matter (discharge position, e.g., earth discharge position). The three-dimensional information on the container 12 may be used for a control to automatically move the leading end attachment 25c to the discharge position for the transport matter or to assist the movement.

[Example 2] Three-dimensional information on the container 12 may be displayed on a display part such as a screen. The display part may be provided in the operating room 11a of the transport vehicle 10, on the cab 23a of the working machine 20, or outside the transport vehicle 10 and the working machine 20. [Example 2a] Three-dimensional information on the container 12 may be used to indicate a distance from a specific section of the container 12 to a specific section of the working machine 20. The "specific section of the container 12" may be a rear surface 13b, a side surface 13c, or a front surface 13d. The "specific section of the working machine 20" may be, for example, a leading end attachment 25c, a cab 23a, or the origin of machine coordinates. [Example 2b] Three-dimensional information on a container 12 may be used to plot three-dimensional coordinates of characteristic points F (see FIG. 5). The plotted coordinates are not necessarily required to have the same origin as the origin (origin of the machine coordinates) used to calculate the three-dimensional information on the container 12. [Example 2c] Three-dimensional information on the container 12 shown in FIG. 2 may be used for display of an obstacle between a container 12 and a distance image acquiring part 40 (see FIG. 3). For example, the three-dimensional information on the container 12 may be used for display of an amount of the transport matter (such as soil) in the container 12.

(Study)

The following problems can be seen to arise in a case where the calculation part 53 calculates only three-dimensional information on a characteristic point F without use of three-dimensional information on the flat face part 13. [Problem 1] In this case, a stable calculation of the three-dimensional information of the characteristic point F can be hardly achieved, because the calculation is liable to be affected by disturbances. [Problem 1a] For example, when an obstacle exists between a characteristic point F and a camera for taking an image of the characteristic point F, the obstacle prevents the camera from taking the image of the characteristic point F. This consequently prevents the calculation part 53 from identifying the characteristic point F. [Problem 1b] Further, in an attempt to identify the characteristic point F being a point among the images taken by the camera, the calculation part 53 is liable to output a wrong point as the characteristic point F. This causes the calculation part 53 to output the three-dimensional position of the wrong point as the three-dimensional position of the characteristic point F. [Problem 1c] Further, the accuracy in the calculation of three-dimensional information on the characteristic point F may not be secured due to noises of the camera. On the other hand, in a case that a light source is provided at a position corresponding to the characteristic point F of the actual container 12 instead of the container 12 in the image to reduce the adverse effects of the noises, the provision of the light source will raise the costs.

Another study will be done about a case where the calculation part 53 calculates three-dimensional information on the characteristic point F merely by executing image processing on the basis of two-dimensional information (image) of the container 12 without use of a distance image D of the container 12. Three-dimensional positions of four points in the container 12 can be calculated on the basis of positions of four points of the container 12 in an image and information on a known distance (actual distance) between three points of the container 12 as disclosed in paragraph [0029] of Patent Literature 1, for example. [Problem 2a] This case has, similarly to [Problem 1], a difficulty in the stable calculation of three-dimensional information on the characteristic points F because the calculation is liable to be affected by disturbances. [Problem 2b] Additionally, in this case, the distance (actual distance) between three points of the container 12 is necessary to be known. Therefore, the calculation of the three-dimensional positions of four points of the container 12 cannot be achieved for a container 12 in which a distance between three points is unknown. Specifically, for example, in a case of a changed transport vehicle 10 having a different type and size, three-dimensional positions of four points of the container 12 cannot be calculated unless a distance between three points of the container 12 of the changed transport vehicle 10 is known.

There is the following problem in a case where the calculation part 53 calculates three-dimensional information on four points of the container 12, i.e., four points at forward and rearward ends of the left and right side surfaces 13c in view of the transport vehicle (four points, i.e., forward and rearward points of left and right side surfaces 13c). [Problem 3] In this case, information on a shape of the front surface 13d cannot be obtained. Here, the front surface 13d protrudes more upwardly than the left and right side surfaces 13c. Therefore, in the case where three-dimensional information on only the four points that are the forward and rearward points of the side surfaces 13c is calculated, the calculation part 53 cannot obtain a protruding amount of the front surface 13d upward from the side surfaces 13c. If the three-dimensional information on only the four points that are the forward and rearward points of the left and right side surfaces 13c is used for an automatic operation of the working machine 20, for example, the leading end attachment 25c is liable to come into contact with the front surface 13d.

On the other hand, in the present embodiment, the calculation part 53 calculates three-dimensional information on the container 12 on the basis of three-dimensional information on not only the characteristic points F but also the flat face part 13. Accordingly, the three-dimensional information on the container 12 can be stably calculated. Consequently, the robustness can be enhanced. For example, even when a part of the group of points of the flat face part 13 is affected by disturbances, three-dimensional information on the flat face part 13 can be calculated on the basis of the residual part of the group of points of the flat face part 13. Further, in the present embodiment, the three-dimensional information on the container 12 calculated by the calculation part 53 includes information on the three-dimensional shape of the container 12. Therefore, the three-dimensional information on the container 12 can be suitably used for a control. Specifically, for example, the three-dimensional information on the container 12 includes the three-dimensional shape of the front surface 13d, and a control of the automatic operation and a control to avoid a collision can be executed to prevent the leading end attachment 25c from coming into contact with the front surface 13d. Further, in the present embodiment, even if the dimension of the container 12 changes, that is, the shape and size of the container 12, and the angle of the container 12 with respect to the working machine 20 (see FIG. 1) change, the three-dimensional information on the container 12 is calculated for each change. Accordingly, for example, even if the type of the transport vehicle 10, the angle of the transport vehicle 10 with respect to the working machine 20, and the like change, three-dimensional information on the container 12 can be calculated. It should be noted that the present invention includes an embodiment which solves one of the problems described above.

Advantageous Effects

Advantageous effects of the container measuring system 30 shown in FIG. 2 are as follows.

Advantageous Effects of First Invention

The container measuring system 30 includes the distance image acquiring part 40 and the calculation part 53. The distance image acquiring part 40 is provided on the working machine 20 for performing a work of loading into the container 12 shown in FIG. 1, and is capable of acquiring a distance image D of the container 12 shown in FIG. 3. The calculation part 53 (see FIG. 3) processes the distance image D of the container 12 acquired by the distance image acquiring part 40 (see FIG. 3).

[Configuration 1] The calculation part 53 (see FIG. 3) calculates a three-dimensional position of the flat face part 13 constituting the container 12 on the basis of the distance image D of the container 12. The calculation part 53 calculates three-dimensional information including a three-dimensional position and a three-dimensional shape of the container 12 on the basis of the three-dimensional position of the flat face part 13.

In [Configuration 1], three-dimensional information on the container 12 is calculated on the basis of the three-dimensional position of the flat face part 13. Therefore, the three-dimensional information on the container 12 can be calculated at a stably higher accuracy compared with a case where the three-dimensional information on the container 12 is calculated on the basis of the three-dimensional positions of only points such as characteristic points F, for example. Consequently, the three-dimensional information on the container 12 can be properly applied to a control and the like.

Advantageous Effects of Second Invention

[Configuration 2] The calculation part 53 (see FIG. 3) calculates a three-dimensional position of a section of the flat face part 13 that is out of the distance image D on the basis of the three-dimensional position of the section of the flat face part 13 that is in the distance image D.

Owing to [Configuration 2], three-dimensional position of the flat face part 13 can be calculated even when a section of the flat face part 13 is out of the distance image D. Therefore, the three-dimensional information on the container 12 can be calculated at a stably high accuracy even when a section of the flat face part 13 is out of the distance image D.

Advantageous Effects of Third Invention

[Configuration 3] The container 12 is a box bed provided on a transport vehicle 10 transporting a mass of matter that is loaded by the working machine 20.

Since the container 12 is the box bed provided on the transport vehicle 10, in [Configuration 3] the container 12 is movable. Further, it is assumed that the shape and size of the container 12 changes according to a change in the type of the transport vehicle 10. Even if such change occurs in the container 12, three-dimensional information on the container 12 can be calculated owing to [Configuration 1].

Modifications

Description will be made about a modification of the container measuring system 30 shown in FIG. 3 referring to differences from the embodiment mainly with reference to FIGS. 3, 6, and 7. Description will be omitted about the elements of the modification that are the same as the embodiment. The modified container measuring system 30 further includes an operation information acquiring part 155. Additionally, a controller 50 further includes a storage part 153*m*.

The storage part 153*m* stores three-dimensional information on a container 12 (sec FIG. 2) calculated by a calculation part 53.

The operation information acquiring part 155 acquires information on an operation of a working machine 20 shown in FIG. 1. The operation information acquiring part 155 (see FIG. 3) may acquire information on a rotation (information on slewing) of an upper slewing body 23 with respect to a lower traveling body 21. The operation information acquiring part 155 may acquire information (e.g., a traveling distance on the ground and a traveling speed) on a travel of the lower traveling body 21. The operation information acquiring part 155 may acquire information on an operation of an attachment 25. Specifically, the operation information acquiring part 155 may acquire information on a rotation of a boom 25*a* with respect to the upper slewing body 23, information on a rotation of an arm 25*b* with respect to the boom 25*a*, and information on a rotation of a leading end attachment 25*c* with respect to the arm 25*b*. The "information on a rotation" may include, for example, a rotation angle, or a variation amount (e.g., speed) of a rotation angle. The operation information acquiring part 155 may include an angle sensor, a device utilizing a satellite positioning system, or a device utilizing a total station.

Operation

The modified container measuring system 30 (see FIG. 3) is configured to operate as follows. When the working machine 20 (see FIG. 1, below-described working machines 20 are the same) executes an operation (referred to as "operation a"), a change occurs in a posture of the container 12 in a distance image D shown in FIG. 2. There is a case where a section of the container 12 which lies in the distance image D before the operation a lies beyond the distance image D as shown in FIG. 7, or is hidden by an obstacle. In view thereof, the three-dimensional information on the container 12 shown in FIG. 2 before the execution of the operation a is stored in the storage part 153*m* (see FIG. 3). Further, information on the operation a is acquired by the operation information acquiring part 155 (sec FIG. 3). Subsequently, the calculation part 53 (see FIG. 3) calculates (estimates) three-dimensional information on the container 12 (see FIG. 7) after the execution of the operation a on the basis of the three-dimensional information on the container 12 before the execution of the operation a and the information on the operation a. The following description will be made mainly about a specific example of processings of the calculation part 53 (see FIG. 3, below-described calculation parts 53 are the same) mainly with reference to FIG. 6.

The calculation part 53 determines whether to initialize information in the storage part 153*m* (see FIG. 3) (Step S101 shown in. FIG. 6). This initialization is executed, for example, before a start of an operation of loading into the container 12 shown in FIG. 2. Specifically, for example, the calculation part 53 determines whether the condition (condition for initialization) for initializing information in the storage part 153*m* (see FIG. 3) is satisfied. The condition for initialization is set in the calculation part 53 in advance (before Step S101 shown in FIG. 6). For example, the condition for initialization may include an absence of three-dimensional information on the container 12 in the storage part 153*m* (see FIG. 3). The condition for initialization may include a manipulative selection (e.g., a button manipulation) by an operator of the working machine 20 for initialization. The condition for initialization may include an event that a distance between the container 12 and the working machine 20 falls within a predetermined range.

In a case of initializing information in the storage part 153*m* (see FIG. 3) (YES in. Step S101 shown in FIG. 6), the calculation part 53 calculates three-dimensional information on the container 12 (Step S102 shown in FIG. 6). This calculation is executed through steps shown in FIG. 4. Thereafter, the calculation part 53 causes the storage part 153*m* (see FIG. 3) to store three-dimensional information on the container 12 shown in FIG. 2 (Step S103 shown in FIG. 6).

Figure 6:
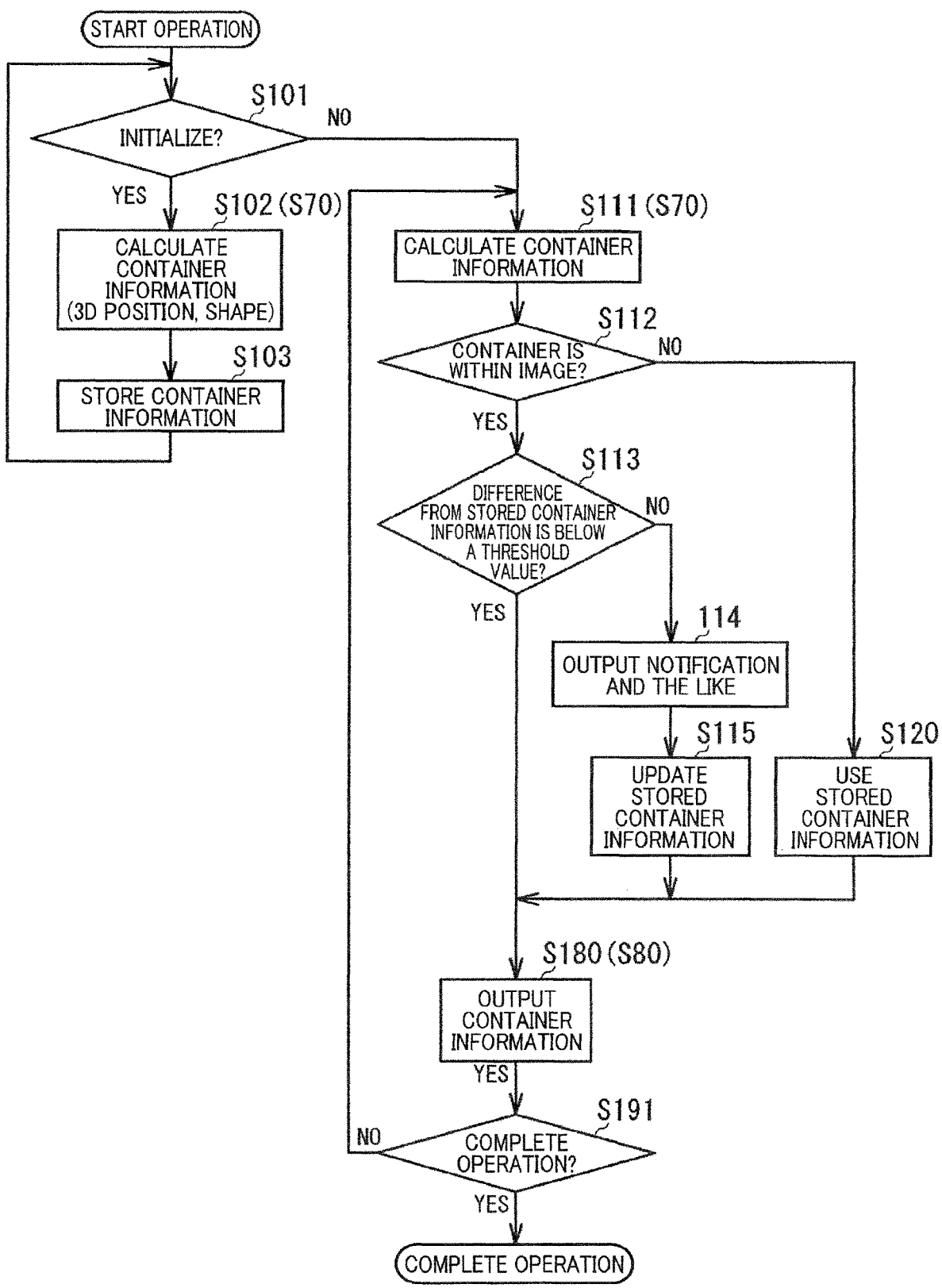
FIG. 6 is a flowchart showing a modified operation sequence of the container measuring system 30 shown in FIG. 3.

In a case of not initializing information in the storage part 153*m* (NO in Step 8101 shown in FIG. 6), the flow proceeds to Step S111 (see FIG. 6). For example, when three-dimensional information on the container 12 is stored in the storage part 153*m* (sec FIG. 3) after a start of an operation and the distance between the container 12 and the working machine 20 falls within a predetermined range (e.g., when a work of loading is in progress), the information in the storage part 153*m* is not initialized.

In Step S111 (see FIG. 6), the calculation part 53 calculates three-dimensional information on the container 12. This calculation is executed through steps shown in FIG. 4. In this Step S111, there is a case where at least a section of the container 12 not falling within the distance image D as shown in FIG. 7 disables the calculation part 53 to calculate three-dimensional information on the at least a section of the container 12. Further, immediately after an initialization (Step S102) of the storage part 153*m* (see FIG. 3), present (current) three-dimensional information on the container 12 is calculated. Therefore, the calculation part 53 is not required to calculate three-dimensional information on the container 12.

Next, the calculation part 53 determines whether the container 12 is (included) in the distance image D (Step S112 shown in FIG. 6). More specifically, the calculation part 53 determines whether the container 12 in the distance image D is sufficiently taken to calculate three-dimensional information on the container 12. Criteria to determine whether the container 12 is in the distance image D may be set in various ways. For example, the calculation part 53 may determine whether the entire container 12 is in the distance image D. The calculation part 53 may determine whether the entire flat face part 13 (specific surface) is in the distance image D. For example, the calculation part 53 may determine whether the flat face part 13 in the distance image D is sufficiently taken to calculate a three-dimensional position of the flat face part 13 (specific surface). The calculation part 53 may determine whether all the characteristic points F (F1 to F8) are in the distance image D. The calculation part 53 may determine whether all the links L (L1 to L10) are in the distance image D. When the container 12 is in the distance image D (YES in Step S112 shown in FIG. 6), the flow proceeds to Step S113 (see FIG. 6). When the container 12 is not in the distance image D (NO in Step S112 shown in FIG. 6), the flow proceeds to Step S120 (see FIG. 6).

In a Case that Container 12 is in Distance Image D

In Step S113 (see FIG. 6), the calculation part 53 determines whether to update the three-dimensional information on the container 12 stored in the storage part 153m (see FIG. 3) (Step S113 shown in FIG. 6). More specifically, a threshold value concerning a difference between the three-dimensional information on the container 12 calculated by the calculation part 53 (referred to as "current three-dimensional information") and the three-dimensional information on the container 12 stored in the storage part 153m (referred to as "stored three-dimensional information") is set in the calculation part 53. The "difference" may specifically include, for example, a difference in coordinates of characteristic points F, and a difference in positions and directions of links L. When the working machine 20 and the container 12 are not moved (or substantially not moved), the difference is below the threshold value. When at least one of the working machine 20 and the container 12 moves, the difference exceeds the threshold value.

When the difference is below the threshold value (YES in Step S113 shown in FIG. 6), the calculation part 53 does not update the stored three-dimensional information to the current three-dimensional information. In this case, the flow proceeds to Step S180 (see FIG. 6).

When the difference exceeds the threshold value (NO in Step S113 shown in FIG. 6), the calculation part 53 updates the stored three-dimensional information to the current three-dimensional information (Step S115 shown in FIG. 6). When updating, the calculation part 53 may output a signal to an internal portion or an outside of the calculation part 53 (Step S114 shown in FIG. 6). For example, the calculation part 53 may output information showing the update of the three-dimensional information to another processing (e.g., a control) executed by the calculation part 53. The calculation part 53 may output, for example, a notification (such as an alarm) to an operator of the working machine 20 and the like. This notification may be a sound or a display. Switching between doing and not doing this notification may be executed in accordance with a condition (e.g., a switching manipulation of an operator, or a determination of the calculation part 53). Next, the calculation part 53 outputs the current three-dimensional information as the three-dimensional information on the container 12 (Step S180 shown in FIG. 6). The output processing in Step S180 is the same as the output processing in Step S80 shown in FIG. 4.

In a Case that Container 12 is Not in Distance Image D

Figure 7:
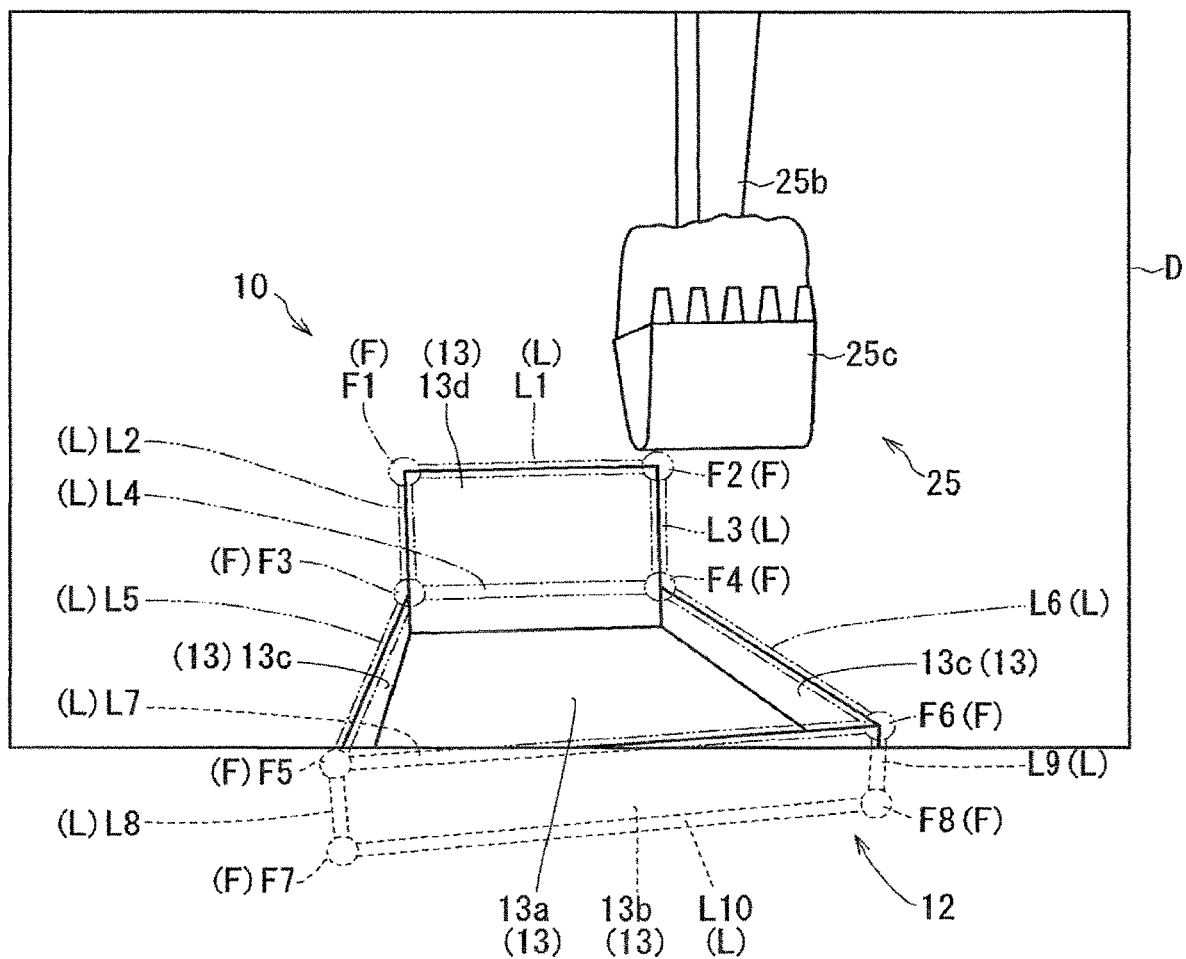
FIG. 7 is a diagram corresponding to FIG. 2 illustrating a case where a section of the container 12 shown in FIG. 2 is out of the distance image D.

When the container 12 shown in FIG. 7 is not in the distance image D (NO in Step S112 shown in FIG. 6), the calculation part 53 utilizes the stored three-dimensional information (Step S120 shown in FIG. 6). More specifically, the calculation part 53 executes the following processings.

The calculation part 53 acquires information on the operation a of the working machine 20 acquired by the operation information acquiring part 155 (see FIG. 3). Subsequently, the calculation part 53 corrects the stored three-dimensional information on the basis of the information on the operation a of the working machine 20. Specifically, for example, when the upper slewing body 23 slews (operation a) with respect to the lower traveling body 21 shown in FIG. 1, a change (rotational movement) occurs in the three-dimensional position of the container 12. Here, the calculation part 53 can calculate (estimate) a three-dimensional position of the container 12 after the slewing of the upper slewing body 23 on the basis of a variation in the slewing angle of the upper slewing body 23 without information acquired by the distance image acquiring part 40. Similarly, even when the lower traveling body 21 travels (operation a), the calculation part 53 can calculate three-dimensional information on the container 12 after the travel of the lower traveling body 21 without information acquired by the distance image acquiring part 40. Next, the calculation part 53 outputs the stored three-dimensional information after the correction on the basis of the information on the operation a of the working machine 20 as the three-dimensional information on the container 12 (Step S180 shown in FIG. 6).

FIG. 7 shows a case where a section of the container 12 is beyond the distance image D as an example. However, the calculation part 53 may calculate three-dimensional information on the container 12 on the basis of the stored three-dimensional information even when the entire container 12 is beyond the distance image D. Further, the calculation part 53 may calculate three-dimensional information on the container 12 by utilizing the stored three-dimensional information when the working machine 20 does not slew or travel. There is a case where at least a section of the container 12 is beyond the distance image D when, for example, an obstacle is arranged between the container 12 and the distance image acquiring part 40 (see FIG. 1). In this case, the stored three-dimensional information may be output as the three-dimensional information on the container 12 (Step S180 shown in FIG. 6). For example, when the obstacle is an attachment 25, the calculation part 53 may identify a section of the container 12 that is beyond the distance image D on the basis of information on the operation a of the attachment 25 acquired by the operation information acquiring part 155 (see FIG. 3).

Next, the calculation part 53 determines whether the work of loading transport matter by the working machine 20 is completed (Step S191 shown in FIG. 6). The work of loading is determined to be completed, for example, when a predetermined amount of transport matter is placed in the container 12 and the work is finished. The calculation part 53 determines whether the condition for determining a completion of a work of loading (a condition for a work completion) is satisfied. The condition for a work completion is set in the calculation part 53 in advance (before Step S191 shown in FIG. 6). The condition for a work completion may include, for example, an event that a predetermined distance or greater emerges between the working machine 20 and the transport vehicle 10. When the condition for a work completion is satisfied (YES in Step S191 shown in FIG. 6), the calculation part 53 finishes the processing of calculating three-dimensional information on the container 12. When the condition for a work completion is not satisfied (NO in Step S191 shown in FIG. 6), the calculation part 53 repeats the processing of calculating three-dimensional information on the container 12, specifically, for example, returning to Step S111 (see FIG. 6).

Advantageous Effects

Advantageous effects of the modified container measuring system 30 shown in FIG. 3 are as follows.

Advantageous Effects of Fourth Invention

The container measuring system 30 includes the operation information acquiring part 155. The operation information acquiring part 155 acquires information on an operation a of the working machine 20 (see FIG. 1) including at least one of slewing and traveling.

[Configuration 4] The calculation part 53 includes the storage part 153m for storing three-dimensional information on a container 12 (see FIG. 2) calculated by the calculation part 53. The calculation part 53 calculates three-dimensional information on the container 12 after an execution of the operation a on the basis of three-dimensional information on the container 12 stored in the storage part 153m before the execution of the operation a and information on the operation a acquired by the operation information acquiring part 155 (see Step S120 shown in FIG. 6).

Owing to [Configuration 4], the three-dimensional information on the container 12 (see FIG. 7) can be calculated at a higher accuracy compared with a case of not executing the calculation according to [Configuration 4]. Specifically, for example, there is a case where the state that the container 12 entirely lies in the distance image D acquired by the distance image acquiring part 40 (see FIG. 2) shifts to the state that the container 12 partially lies beyond the distance image D (see FIG. 7) due to an execution of an operation (operation a) by the working machine 20 shown in FIG. 1. Thus, even when at least a section of the container 12 is beyond the distance image D shown in FIG. 7, the calculation part 53 can calculate the three-dimensional information on the container 12 at a high accuracy on the basis of the stored three-dimensional information and the information on the operation a.

Advantageous Effects of Fifth Invention

[Configuration 5] A threshold value for a difference between the three-dimensional information on the container 12 (see FIG. 7) calculated by the calculation part 53 (current three-dimensional information) and the three-dimensional information on the container 12 (see FIG. 7) stored in the storage part 153m (stored three-dimensional information) is set in the calculation part 53. The calculation part 53 updates the three-dimensional information on the container 12 (see FIG. 7) stored in the storage part 153m to the three-dimensional information on the container 12 (see FIG. 7) calculated by the calculation part 53 when the difference exceeds the threshold value (see Step S115 shown in FIG. 6).

In [Configuration 5], the stored three-dimensional information is updated to the current three-dimensional information when the difference between the current three-dimensional information and the stored three-dimensional information exceeds the threshold value. Therefore, even when one of the working machine 20 and the container 12 shown in FIG. 1 moves, a calculation (calculation according to [Configuration 4]) of three-dimensional information on the container 12 by use of the stored three-dimensional information can be executed.

Modifications

The embodiment and the modifications may be variously modified. An arrangement and a shape of each constituent element in the embodiment and the modifications may be changed. For example, the flow of processings shown in FIGS. 4 and 6 may be changed, or a part of processings may be omitted. For example, a range and a value such as "a predetermined range" and "a threshold value" may be fixed, be manually varied, or automatically varied according to some condition. For example, the number of constituent elements may be changed, or a part of the constituent elements may be omitted. For example, an element described as a plurality of mutually different members or sections may be composed by a single member or section. For example, an element described as a single member or section may include a plurality of separately provided members or sections which are different from each other.

Summary of Embodiments

The embodiments can be summarized as follows.

The container measuring system according to the present embodiment is provided on a working machine for performing a work of loading into a container including a flat face part, and includes: a distance image acquiring part for acquiring a distance image of the container; and a calculation part for processing the distance image of the container acquired by the distance image acquiring part. The calculation part calculates: a three-dimensional position of the flat face part on the basis of the distance image of the container, and three-dimensional information including a three-dimensional position and a three-dimensional shape of the container on the basis of the three-dimensional position of the flat face part.

According to this configuration, three-dimensional information on the container is calculated on the basis of a three-dimensional position of the flat face part. Therefore, the three-dimensional information on the container can be calculated at a stably higher accuracy compared with a case where the three-dimensional information on the container is calculated on the basis of the three-dimensional positions of only points such as characteristic points, for example. Consequently, the three-dimensional information on the container can be suitably applied to a control and the like.

In the container measuring system, the calculation part preferably calculates a three-dimensional position of a section of the flat face part that is beyond the distance image on the basis of a three-dimensional position of a section of the flat face part that is in the distance image.

According to this configuration, a three-dimensional position of the flat face part can be calculated even when a section of the flat face part is beyond the distance image. Consequently, the three-dimensional information on the container can be calculated at a stably higher accuracy even when a section of the flat face part is beyond the distance image.

Preferably, the container measuring system further includes: an operation information acquiring part for acquiring information on an operation of the working machine including at least one of slewing and traveling; and a storage part for storing the three-dimensional information on the container calculated by the calculation part, and the calculation part calculates the three-dimensional information on the container after an execution of the operation on the basis of the three-dimensional information on the container stored in the storage part before the execution of the operation and information on the operation acquired by the operation information acquiring part.

According to this configuration, the calculation part can calculate three-dimensional information on the container at a high accuracy on the basis of the stored three-dimensional information and the information on the operation even when at least a section of the container is beyond the distance image.

Preferably, in the container measuring system, the calculation part has a threshold value for a difference between the three-dimensional information on the container calculated by the calculation part and the three-dimensional information on the container stored in the storage part, and the calculation part updates the three-dimensional information on the container stored in the storage part to the calculated three-dimensional information on the container when the difference exceeds the threshold value.

According to this configuration, the stored three-dimensional information on the container is updated when the difference between the stored three-dimensional information and the current three-dimensional information on the container exceeds the threshold value. This prevents an execution of upgrading when the difference is marginal, thereby reducing the processing load for the calculation part.

Preferably, in the container measuring system, the container is a box bed provided on a transport vehicle for transporting a transport matter loaded by the working machine. According to this configuration, three-dimensional information on a box bed provided on a transport vehicle can be accurately calculated.

Preferably, in the container measuring system, the calculation part estimates the three-dimensional position of the section of the flat face part that is beyond the distance image on the basis of the three-dimensional position of the section of the flat face part that is in the distance image on the assumption that the flat face part is a continuous flat.

According to this configuration, the flat face part is assumed to be a continuous flat. Therefore, three-dimensional information on the flat face part that is beyond the distance image can be accurately calculated.

Preferably, in the container measuring system, the flat face part includes a bottom surface of the box bed and surfaces surrounding the bottom surface.

According to this configuration, three-dimensional information on the bottom surface of the box bed and surfaces surrounding the bottom surface can be obtained.

Preferably, in the container measuring system, the three-dimensional position of the flat face part concerns a three-dimensional position of a corner and a side of the flat face part, and the shape information on the flat face part includes three-dimensional positions of a group of points on the side.

According to this configuration, three-dimensional information including three-dimensional positions of a corner and a side of each flat face part of the container, and a group of points on the side can be calculated.

The invention claimed is:

1. A container measuring system provided on a working machine for performing a work of loading into a container including a flat face part, comprising:
   a distance image acquiring part provided on the working machine and configured to acquire a distance image of the container, the distance image acquiring part comprising a camera; and
   a controller comprising circuitry configured to process the distance image of the container acquired by the distance image acquiring part, wherein
   the controller calculates:
       a three-dimensional position of the flat face part on the basis of the distance image of the container, and
       three-dimensional information including a three-dimensional position and a three-dimensional shape of the container on the basis of the three-dimensional position of the flat face part,
   the controller calculates a three-dimensional position of a section of the flat face part that is beyond the distance image on the basis of a three-dimensional position of a section of the flat face part that is in the distance image, and
   the controller estimates the three-dimensional position of the section of the flat face part that is beyond the distance image on the basis of the three-dimensional position of the section of the flat face part that is in the distance image on the assumption that the flat face part is continuously flat.

2. The container measuring system according to claim 1, further comprising:
   an operation information acquiring part including a sensor configured to acquire information on an operation of the working machine including at least one of slewing and travelling, wherein
   the controller is configured to store the three-dimensional information on the container calculated by the controller, and
   the controller calculates the three-dimensional information on the container after an execution of the operation on the basis of the three-dimensional information on the container stored in the controller before the execution of the operation and information on the operation acquired by the operation information acquiring part.

3. The container measuring system according to claim 2, wherein
   the controller has a threshold value for a difference between the three-dimensional information on the container calculated by the controller and the three-dimensional information on the container stored in the controller, and
   the controller updates the three-dimensional information on the container stored in the controller to the calculated three-dimensional information on the container when the difference exceeds the threshold value.

4. The container measuring system according to claim 1, wherein
   the container is a box bed provided on a transport vehicle for transporting a transport matter loaded by the working machine.

5. The container measuring system according to claim 4, wherein
   the flat face part includes a bottom surface of the box bed and surfaces surrounding the bottom surface.

6. The container measuring system according to claim 1, wherein
   the three-dimensional position of the flat face part concerns a three-dimensional position of a corner and a side of the flat face part, and
   the shape information on the flat face part includes three-dimensional positions of a group of points on the side.

7. A container measuring system provided on a working machine for performing a work of loading into a container including a flat face part, comprising:
   a distance image acquiring part provided on the working machine and configured to acquire a distance image of the container, the distance image acquiring part comprising a camera;
   a controller comprising circuitry configured to process the distance image of the container acquired by the distance image acquiring part, wherein the controller calculates:

a three-dimensional position of the flat face part on the basis of the distance image of the container, and three-dimensional information including a three-dimensional position and a three-dimensional shape of the container on the basis of the three-dimensional position of the flat face part; and an operation information acquiring part including a sensor configured to acquire information on an operation of the working machine including at least one of slewing and travelling, wherein the controller is configured to store the three-dimensional information on the container calculated by the controller, the controller calculates the three-dimensional information on the container after an execution of the operation on the basis of the three-dimensional information on the container stored in the controller before the execution of the operation and information on the operation acquired by the operation information acquiring part, the controller has a threshold value for a difference between the three-dimensional information on the container calculated by the controller and the three-dimensional information on the container stored in the controller, and the controller updates the three-dimensional information on the container stored in the controller to the calculated three-dimensional information on the container when the difference exceeds the threshold value.

* * * * *